US008782481B2

(12) United States Patent
Muramoto et al.

(10) Patent No.: US 8,782,481 B2
(45) Date of Patent: Jul. 15, 2014

(54) RECEIVING TERMINAL AND RECEIVING METHOD

(75) Inventors: Eiichi Muramoto, Kanagawa (JP);
Kazunobu Konishi, Osaka (JP);
Takahiro Yoneda, Tokyo (JP); Masashi Kobayashi, Tokyo (JP); Ichiro Takei, Tokyo (JP); Taisuke Matsumoto, Sunnyvale, CA (US)

(73) Assignee: Panasonic Corporation, Osaka (JP)

( * ) Notice: Subject to any disclaimer, the term of this patent is extended or adjusted under 35 U.S.C. 154(b) by 663 days.

(21) Appl. No.: 12/443,007

(22) PCT Filed: Jul. 3, 2008

(86) PCT No.: PCT/JP2008/001771
§ 371 (c)(1),
(2), (4) Date: May 7, 2009

(87) PCT Pub. No.: WO2009/004819
PCT Pub. Date: Jan. 8, 2009

(65) Prior Publication Data
US 2010/0031109 A1 Feb. 4, 2010

(30) Foreign Application Priority Data
Jul. 3, 2007 (JP) ................ 2007-175562

(51) Int. Cl.
*G08C 25/02* (2006.01)
*H04L 1/18* (2006.01)
*H04L 12/18* (2006.01)
*H04L 12/26* (2006.01)
*H04L 29/14* (2006.01)
*H04L 1/00* (2006.01)

(52) U.S. Cl.
CPC .......... *H04L 1/1877* (2013.01); *H04L 12/1854* (2013.01); *H04L 1/1887* (2013.01); *H04L 12/1868* (2013.01); *H04L 2001/0093* (2013.01); *H04L 43/0858* (2013.01); *H04L 69/40* (2013.01)
USPC ........................................................ 714/748

(58) Field of Classification Search
USPC ........................................................ 714/748
See application file for complete search history.

(56) References Cited

U.S. PATENT DOCUMENTS

| | | | |
|---|---|---|---|
| 2001/0027486 A1* | 10/2001 | Takamoto et al. | 709/227 |
| 2003/0076870 A1* | 4/2003 | Moon et al. | 375/130 |
| 2004/0218603 A1* | 11/2004 | Lee et al. | 370/390 |
| 2005/0216812 A1* | 9/2005 | Leon et al. | 714/748 |
| 2006/0280434 A1 | 12/2006 | Suzuki et al. | |
| 2007/0157209 A1 | 7/2007 | Hashimoto et al. | |
| 2007/0249367 A1 | 10/2007 | Sato et al. | |
| 2008/0273554 A1* | 11/2008 | Shao et al. | 370/498 |

FOREIGN PATENT DOCUMENTS

| | | |
|---|---|---|
| JP | 2000-83023 | 3/2000 |
| JP | 2002-124935 | 4/2002 |
| JP | 2003-23462 | 1/2003 |
| JP | 2003-209576 | 7/2003 |
| JP | 2003-234739 | 8/2003 |
| JP | 2008-131599 | 6/2008 |
| WO | 2004/093396 | 10/2004 |

OTHER PUBLICATIONS

English language Abstract of JP 2002-124935, Apr. 26, 2002.
English language Abstract of JP 2003-209576, Jul. 25, 2003.
Yiu et al., IEEE Transactions on Multimedia, vol. 8, No. 12, pp. 219-232, "Lateral Error Recovery for Media Streaming in Application-Level Multicast," (Mar. 2006).
Imai et al., "XCAST6: eXplicit Multicast on IPv6", IEEE/IPSJ SAINT2003 Workshop 4, IPv6 and Applications, Orland, (Jan. 2003).
Handley et al., "TCP Friendly Rate Control (TFRC): Protocol Specification", RFC 3448, (Jan. 2003).

\* cited by examiner

*Primary Examiner* — Jigar Patel
(74) *Attorney, Agent, or Firm* — Greenblum & Bernstein, P.L.C.

(57) ABSTRACT

A receiving terminal is provided that prevents a load on a network near a receiving terminal from increasing when a retransmission request is made to a plurality of other terminals, and enables the probability of being able to compensate for a lost packet by means of a retransmission packet to be increased. In a receiving terminal that transmits a retransmission request for compensating for a lost packet lost in a network, a measurement section measures a time period corresponding to a distance in the network between the receiving terminal and a plurality of receiving terminals, a calculation section calculates for each of the receiving terminals a float (spare time period) found by subtracting the current time and a time period measured by the measurement section from a playback time at which a retransmitted packet is played back, and a decision section decides retransmission request transmission timing and a retransmission request transmission destination for each of the receiving terminals based on the calculated floats.

6 Claims, 11 Drawing Sheets

| PACKET TYPE (PT) | IMPORTANCE |
|---|---|
| 100 | 3 |
| 101 | 2 |
| 102 | 1 |

FIG.5

Figure 1. RTP header according to RFC 3550

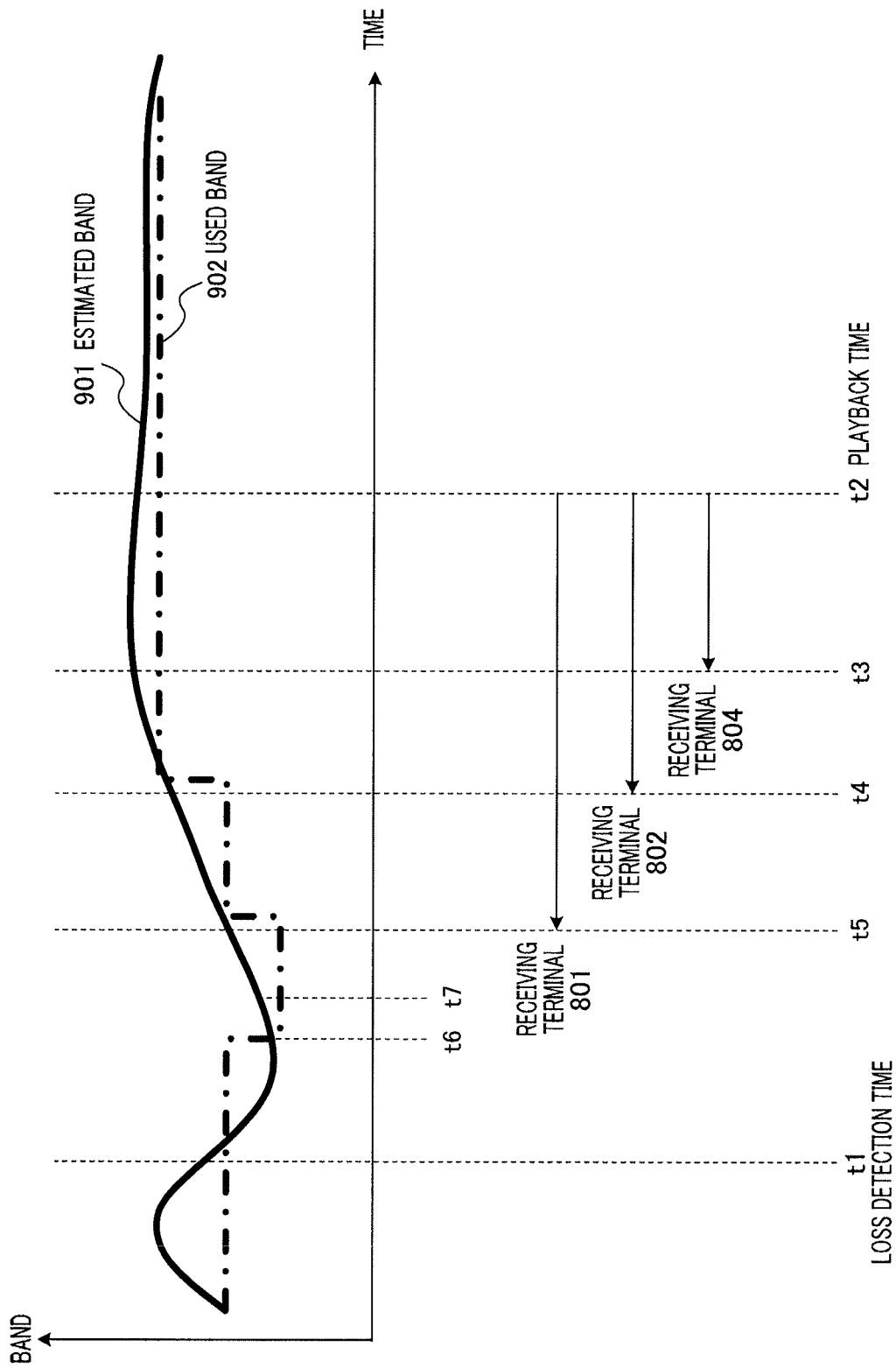

RECEIVING TERMINAL AND RECEIVING METHOD

TECHNICAL FIELD

The present invention relates to a receiving terminal and receiving method that, when data with real-time characteristics such as video or speech is transmitted via a network, perform compensation by receiving a lost packet from another receiving terminal.

BACKGROUND ART

In a live broadcast or teleconference, streaming whereby data with real-time characteristics such as video or speech is transmitted continuously is performed on a one-to-many (live broadcast) or many-to-many (teleconference) basis.

The following are known as distribution methods for performing streaming to a plurality of receiving terminals in a network such as the Internet or an intranet in a company or school: (1) a method in which a plurality of one-to-one unicast communications are used, (2) a method in which an IP multicast is used, (3) a method in which an XCAST is used.

With (1) a method in which a plurality of one-to-one unicast communications are used, a transmitting terminal transmits a packet to a plurality of receiving terminals, and therefore the transmitting terminal load becomes high and the load on a network channel near the transmitting terminal is heightened.

With (2) a method in which an IP multicast is used, a packet transmitted by a transmitting terminal is duplicated and transferred to a plurality of receiving terminals by a router that is a relay apparatus in the network. Consequently, the transmitting terminal load does not become high and the load on a network channel near the transmitting terminal is not heightened. However, an IP multicast packet cannot pass through a router that can only handle a unicast. In order to use an IP multicast, all the routers in a network must support an IP multicast, and therefore it is necessary to install IP multicast compatible routers in the network.

(3) Non-Patent Document 1 discloses an XCAST. With a method in which an XCAST is used, an XCAST packet transmitted by a transmitting terminal is duplicated and transmitted by an XCAST-compatible router in the same way as in an IP multicast. Also, an XCAST packet is transferred to one destination to which distribution has not been performed in the same way as a unicast packet even by an XCAST-incompatible router. All destination addresses to which reception is to be performed are listed in an XCAST packet. A destination to which distribution has not been performed is entered in an XCAST packet. A receiving terminal transmits an XCAST packet to a destination to which distribution has not been performed. When an XCAST that operates in this way is used, the transmitting terminal load does not become high, and neither is the load on a network channel near the transmitting terminal heightened. However, with this method it is necessary to list all destination addresses in a packet, making it unsuitable for a case in which there are many receiving terminals.

Thus, when performing streaming to a plurality of receiving terminals, streaming to the plurality of receiving terminals can be implemented using (1) a method in which a plurality of one-to-one unicast communications are used, (2) a method in which an IP multicast is used, or (3) a method in which an XCAST is used.

When conflict with a packet of another communication or the like occurs in a network, a packet being transmitted may be lost. A method of compensating for a packet loss is to retransmit the same packet from the transmitting terminal. Here, retransmission means that a receiving terminal detecting a packet loss transmits a retransmission request for the lost packet to the transmitting terminal. The transmitting terminal retransmits a packet corresponding to the received transmission request to the receiving terminal. The receiving terminal receives the retransmitted packet and compensates for the lost packet.

However, if this retransmission processing is performed when streaming is performed to a plurality of receiving terminals, a plurality of receiving terminals simultaneously transmit a retransmission request and retransmission requests are concentrated in the transmitting terminal, and therefore the transmitting terminal load becomes high and the load on a network channel near the transmitting terminal is heightened.

With the technology described in Patent Document 1, in order to resolve this problem, when an information distribution apparatus located upstream of a receiving terminal receives a retransmission request, it broadcasts to a receiving terminal information for suppressing transmission of a retransmission request from another receiving terminal. If a receiving terminal receives this information before the timing at which it is to transmit a retransmission request is reached, it does not transmit a retransmission request.

Through this kind of operation, retransmission request transmissions from a plurality of receiving terminals are suppressed, and therefore the transmitting terminal load is not heightened and the load on a network channel near the transmitting terminal is not heightened. However, this method cannot be employed in a network in which broadcast communication cannot be used.

Also, with streaming, real-time characteristics are important. That is to say, it is necessary for a receiving terminal to play back received video, speech, or suchlike data within a fixed time period.

Patent Document 2 proposes a method whereby, when a plurality of receiving terminals perform retransmission in concert, retransmission request transmission timing is calculated that takes account of a streaming playback time in order to perform operation that mutually suppresses retransmission requests.

That is to say, when streaming, retransmission requesting, and retransmission are performed using an IP multicast, a lost packet retransmission request need not necessarily be transmitted to a transmitting terminal. That is, by transmitting a retransmission request by means of an IP multicast, a retransmission request can be transmitted to another receiving terminal, and another receiving terminal can perform retransmission. At this time, a receiving terminal delays retransmission request transmission timing by a random time period. A receiving terminal that receives from another receiving terminal a response to a retransmission request transmitted by means of an IP multicast at earlier timing does not transmit the same retransmission request. Through this kind of operation, retransmission request transmissions are suppressed as a whole, and therefore a problem of retransmission requests from a plurality of receiving terminals being concentrated in the transmitting terminal does not arise.

Thus, Patent Document 2 proposes a method whereby, with respect to the above method, the time period by which retransmission request transmission timing is delayed is adjusted taking the playback time into consideration. By using the method of Patent Document 2, the probability of a problem of a retransmission packet not being in time for the playback time arising can be reduced by having all receiving terminals delay the retransmission request transmission timing by a long time period. However, these methods presuppose an IP multicast, and cannot be employed in a network in which an IP multicast cannot be used.

On the other hand, Non-patent Document 2 discloses TFRC (TCP Friendly Rate Control) as a method of estimating an available band between a transmitting terminal and receiving terminal. With TFRC, an available band is estimated from a Round Trip Time (RTT) and loss event rate between a transmitting terminal and receiving terminal. In streaming, if data is transmitted in accordance with an available band calculated by TFRC, communication in which the probability of a packet being lost is reduced becomes possible. However, if retransmission is applied to streaming whereby data is transmitted using TFRC, a band is consumed by transmitting retransmission requests and retransmission packets. There is thus a problem of the probability of a packet being lost increasing. This probability is further increased when streaming is performed to a plurality of receiving terminals. It is also possible to make retransmission requests to a plurality of receiving terminals while making provision for retransmission request and retransmission packet losses. In this case, however, there is a problem of the load on a network channel near a receiving terminal being heightened due to a concentration of retransmission requests, and of retransmission requests being lost.

Patent Document 1: Japanese Patent Application Laid-Open No. 2002-124935
Patent Document 2: Japanese Patent Application Laid-Open No. 2003-209576
Non-patent Document 1: Y. Imai, M. Shin and Y. Kim, "XCAST6: eXplict Multicast on IPv6", IEEE/IPSJ SAINT2003 Workshop 4, IPv6 and Applications, Orland, January 2003
Non-patent Document 2: M. Handley et al., "TCP Friendly Rate Control (TFRC) : Protocol Specification", RFC 3448, Internet <URL:http://www.faqs.org/rfcs/rfc3448.html>

DISCLOSURE OF INVENTION

Problems to be Solved by the Invention

That is to say, with the above-described conventional technologies, when a retransmission request to a plurality of receiving terminals is made in an environment in which an IP multicast cannot be used, it is necessary to repeatedly transmit a plurality of retransmission requests by means of a unicast. There is consequently a problem of the load on a network channel near a receiving terminal being heightened due to a concentration of a plurality of retransmission requests, and retransmission requests being lost as a result, decreasing the probability of being able to compensate for a lost packet by means of retransmission.

It is an object of the present invention to provide a receiving terminal and receiving method that prevent a load on a network channel near a receiving terminal from being concentrated when a retransmission request is made to a plurality of other receiving terminals, and enable the probability of being able to compensate for a lost packet by means of a retransmission packet to be increased.

Means for Solving the Problems

A receiving terminal of the present invention transmits a retransmission request for compensating for a lost packet lost in a network, and employs a configuration having: a measurement section that measures a time period corresponding to a distance in the network between the receiving terminal and a plurality of other receiving terminals; a calculation section that calculates for each of the receiving terminals a float (spare time period) found by means of the current time and a time period measured by the measurement section from a playback time at which a retransmitted packet is played back; and a decision section that decides retransmission request transmission timing and a retransmission request transmission destination based on a calculated float.

A receiving method of the present invention is a receiving method in a receiving terminal that transmits a retransmission request for compensating for a lost packet lost in a network, and has: a measuring step of measuring a time period corresponding to a distance in the network between the receiving terminal and a plurality of other receiving terminals; a calculating step of calculating for each of the receiving terminals a float found by means of the current time and a time period measured by the measuring step from a playback time at which are transmitted packet is played back; and a deciding step of deciding retransmission request transmission timing and a retransmission request transmission destination for each of the receiving terminals based on the calculated float.

Advantageous Effect of the Invention

The present invention prevents a load on a network channel near a receiving terminal from being concentrated when a retransmission request is made to a plurality of other receiving terminals, prevents loss of a retransmission packet, and enables the probability of being able to compensate for a lost packet to be increased.

BRIEF DESCRIPTION OF DRAWINGS

FIG. 5 is a drawing showing an example of a table for determining the importance of a lost packet;
FIG. 12 is a drawing showing timing of retransmission request transmission, a band estimated using TFRC, and a band used for video distribution.

BEST MODE FOR CARRYING OUT THE INVENTION

Embodiments of the present invention will now be described with reference to the accompanying drawings.

(Embodiment 1)

Figure 1:
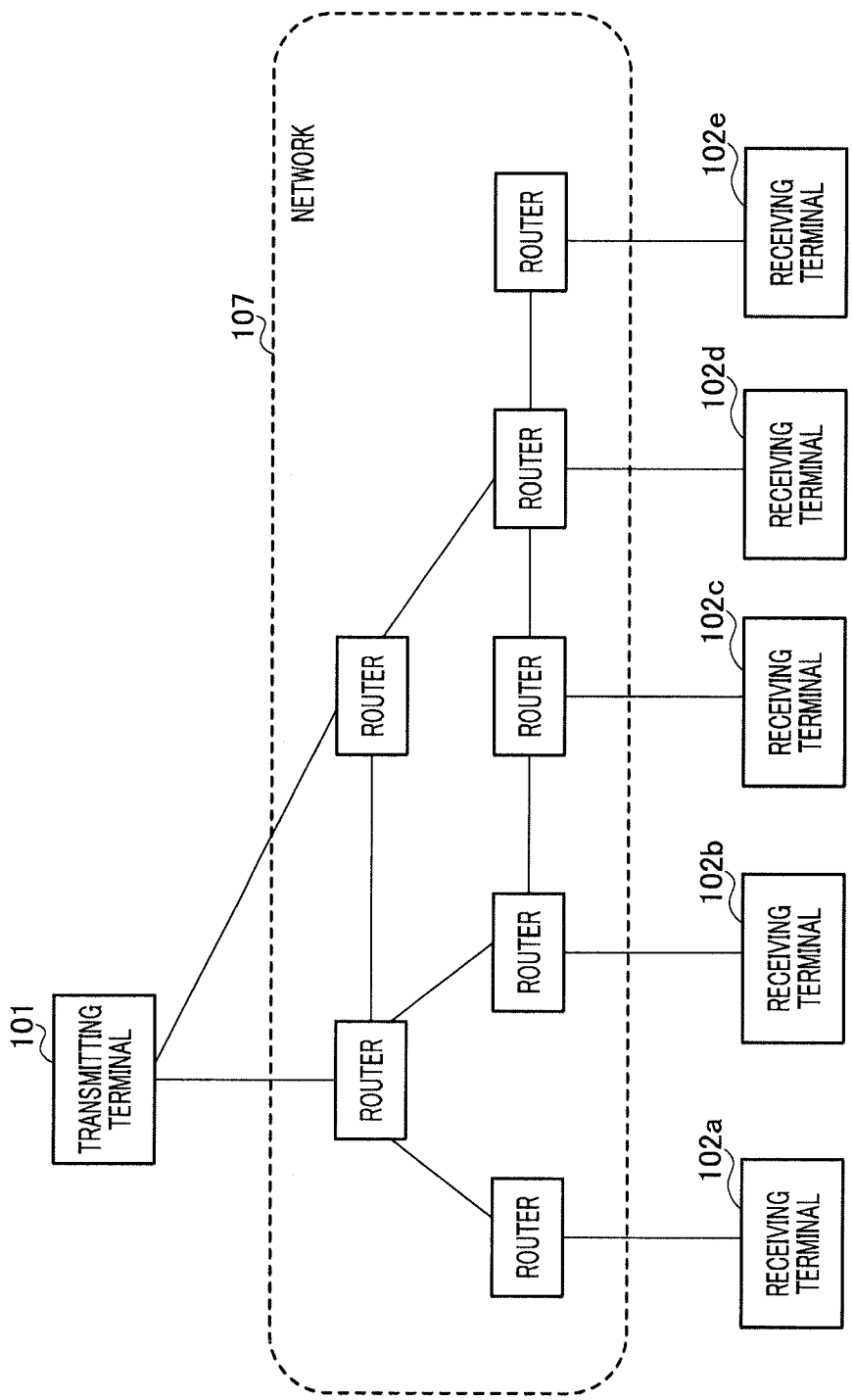
FIG. 1 is a schematic diagram showing a sample configuration whereby receiving terminals according to Embodiment 1 of the present invention are disposed in a network.

FIG. 1 is a schematic diagram showing a sample configuration whereby receiving terminals according to Embodiment 1 of the present invention are disposed in a network. FIG. 1 shows how a plurality of receiving terminals are disposed and operated in a network. In FIG. 1, reference code 101 indicates a transmitting terminal, reference codes 102a through 102e indicate receiving terminals, and reference code 107 indicates a network. Network 107 is composed of a plurality of relay apparatuses (routers).

Transmitting terminal 101 performs video distribution to receiving terminals 102a through 102e via network 107. Transmitting terminal 101 distributes video to receiving terminals 102a through 102e using one-to-one unicast communication. Receiving terminals 102a through 102e have been notified beforehand that other receiving terminals are participating in the same video distribution. The notification method is as follows. First, when each receiving terminal registers the fact that it will receive a service (subscribes), the IP address of each receiving terminal is registered in a server (not shown) that manages subscription to the video distribution service. Then, when video distribution is started, the server notifies each receiving terminal of the IP addresses of the plurality of receiving terminals.

When transmitting terminal 101 distributes video to plurality of receiving terminals 102a through 102e by means of one-to-one unicast communication, if a packet for receiving terminals 102a through 102e is lost in network 107, receiving terminals 102a through 102e detect the packet loss from a gap in sequential numbers entered in packets.

Also, since jitter may occur in the network transmission time when video is distributed, receiving terminals 102 are equipped with a buffer for absorbing this jitter. Receiving terminals 102 buffer received video data for a fixed time period. As long as receiving terminals 102 can receive a retransmitted lost packet during this buffering period, the packet will be in time for video playback, enabling video to be played back without disruption. This reception processing and playback processing will now be described using FIG. 2.

Figure 2:
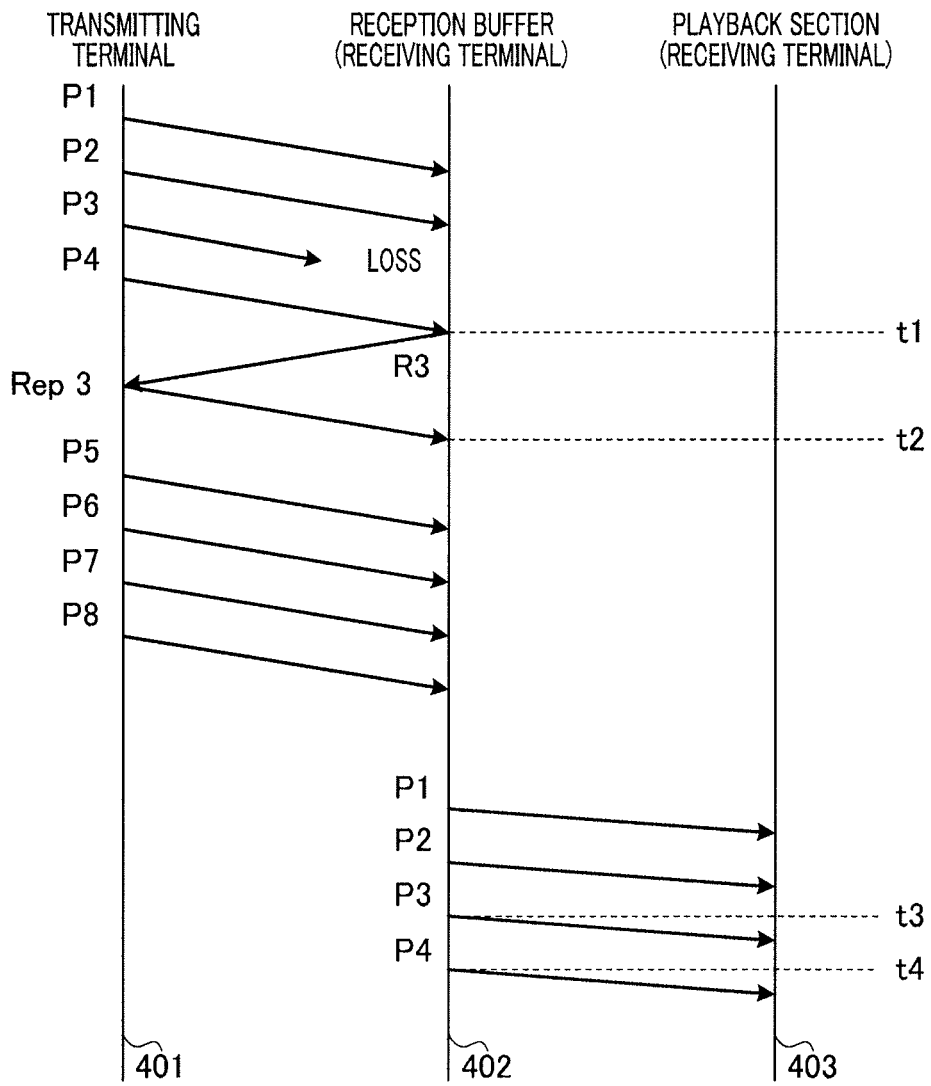
FIG. 2 is a drawing showing an example of video transmission times between a transmitting terminal and a receiving terminal.

FIG. 2 is a drawing showing video transmission flow between transmitting terminal 101 and receiving terminal 102. In FIG. 2, reference code 401 indicates the time axis of transmitting terminal 101, reference code 402 indicates the time axis of a reception buffer in receiving terminal 102, and reference code 403 indicates the time axis of a playback section that plays back video in receiving terminal 102. In FIG. 2, time elapses in the downward direction of the axes. Packets P1 through P4 compose one picture, and packets P5 through P8 compose the next picture. Here, one picture is transmitted divided into a plurality of packets. Time t1 indicates a time at which packet P4 arrives in the reception buffer. Receiving terminal 102 detects a loss of packet P3 at time t1. Time t2 indicates a time at which packet P3 arrives in the reception buffer. Time t3 indicates a packet P3 playback time (playback timing), which is a time at which a packet P3 retransmission packet should arrive in the reception buffer. Time t4 indicates a packet P4 playback time. That is to say, FIG. 2 shows that, with respect to video distribution, receiving terminal 102 performs buffering to absorb jitter only for time period (time t4-time t1). Also, in receiving terminal 102, at time t1 at which a packet P3 loss is detected, there is a time margin (time t3-time t1) until time t3 until packet P3 playback is started. Here, a time (time t3-time t2) resulting from subtracting time t2 at which packet P3 is retransmitted from the packet P3 playback time (time t3) is called "float". If packet P3 retransmission is completed within this float (time t3-time t2), receiving terminal 102 can play back a picture composed of packets P1 through P4 without disruption.

The structure of video data transmitted in video distribution will now be described using FIG. 3.

Figure 3:
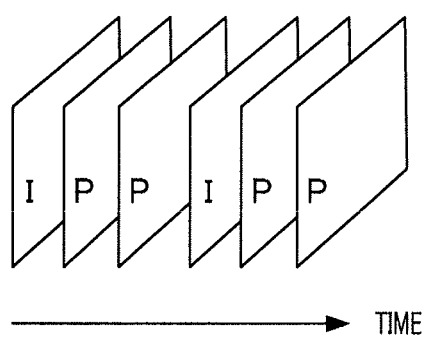
FIG. 3 is a drawing for explaining a sample structure of transmitted video data.

In FIG. 3, reference codes I and P indicate an MPEG4 I-picture and P-picture respectively (an image of one screen being called a picture). An I-picture is a picture having no dependency on another picture, and one screen can be generated with I-picture image data only. However, I-picture image data is large in amount. A P-picture results from encoding a difference from a preceding playback image (I-picture), and decoding cannot be performed unless there is a preceding playback image. However, since a P-picture is obtained by encoding image data of only a difference from an I-picture, the amount of data of a P-picture is small. FIG. 3 shows that video is distributed using a structure whereby one I-picture screen is followed by two P-picture screens.

When video is transmitted using this kind of configuration, if a packet composing an I-picture is lost, that loss affects not only I-picture playback but also playback of the following two P-pictures. That is to say, when a packet composing an I-picture is lost, it is desirable to prioritize successful retransmission of the lost packet and prevent disruption of playback of the following two P-pictures. Also, with MPEG4, one video is encoded divided into a plurality of video content, and in playback, these can be played back in combined form. For example, in a weather forecast program, it is possible to encode an image of a weather map as a background image, encode an image of a forecaster explaining the weather map as a separate image, and perform playback as one video using the two. With this kind of video distribution, it is desirable to prioritize recovery of a packet loss that occurs when distributing the weather map image.

If a packet of high-importance such as an I-picture or weather map image packet is lost, receiving terminals 102 transmit a retransmission request (retransmission request packet) with a higher level of priority than for an unimportant packet. At this time, if a retransmission request is lost in the network, lost packet retransmission does not succeed, and therefore image playback by receiving terminals 102 is disrupted. To prevent this, it is desirable for receiving terminals 102 to transmit a plurality of retransmission requests. However, if receiving terminals 102 transmit a plurality of retransmission requests simultaneously, the network load will increase and there will be a greater possibility of a retransmission request being lost. Thus, receiving terminals 102 are configured so as to sequentially transmit a plurality of retransmission requests to a plurality of retransmission request destinations in a staggered fashion rather than simultaneously.

Figure 4:
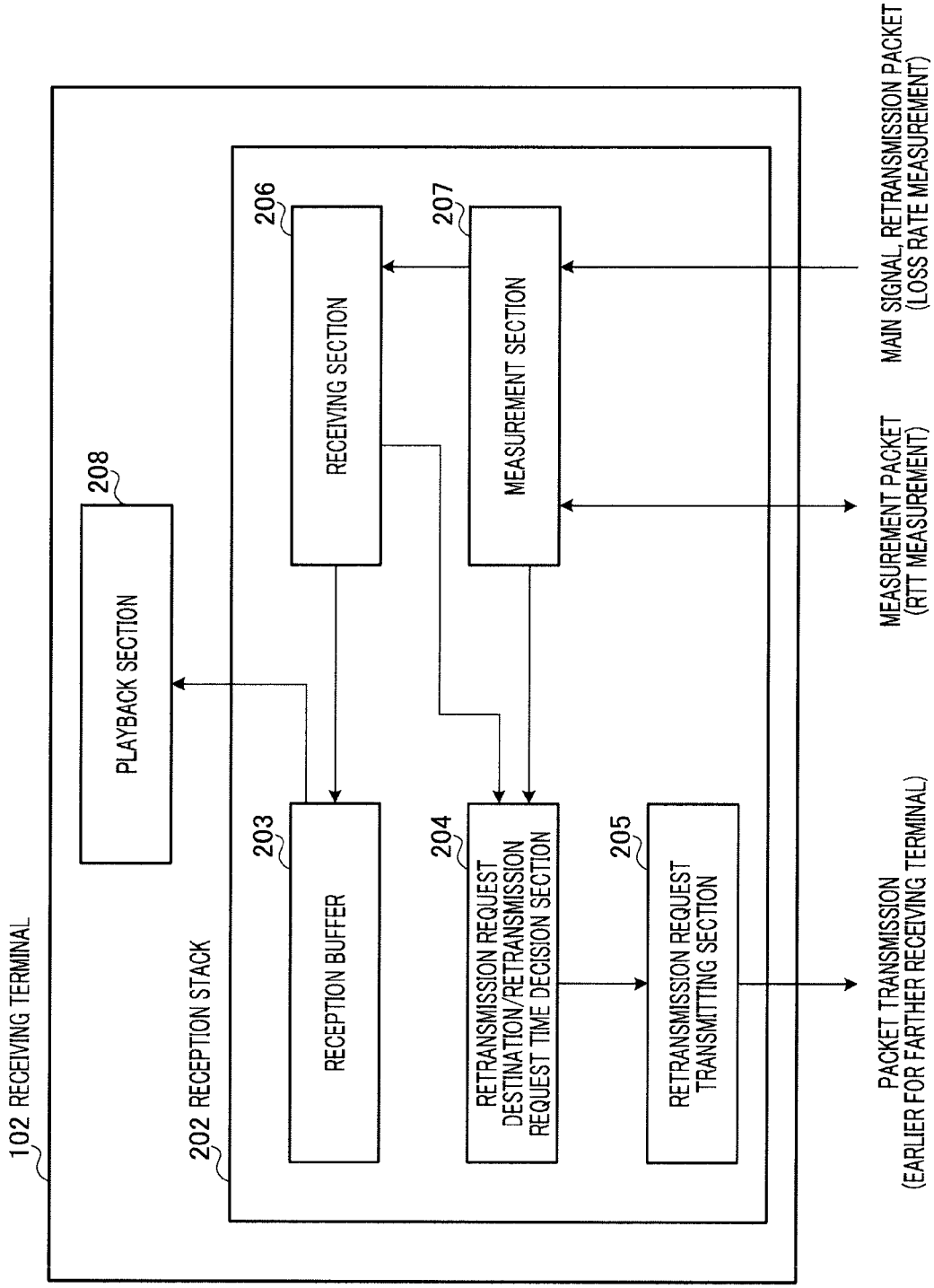
FIG. 4 is a block diagram showing the configuration of a receiving terminal according to this embodiment.

FIG. 4 is a drawing showing a sample configuration of receiving terminals 102a through 102e. In FIG. 4, reference code 102 indicates a receiving terminal, reference code 202 indicates a reception stack in receiving terminal 102, reference code 203 indicates a reception buffer, reference code 204 indicates a retransmission request destination/retransmission request time decision section, reference code 205 indicates a retransmission request transmitting section, reference code 206 indicates a receiving section, reference code 207 indicates a measurement section, and reference code 208 indicates a playback section. Receiving section 206 passes a normally received video distribution packet to reception buffer 203.

When playback time arrives, reception buffer 203 passes video data to playback section 208 in picture units or packet units. Playback section 208 is equipped with a decoder that decodes video and a display that plays back video. Playback section 208 decodes data in picture units or packet units and displays video on the display.

Measurement section 207 measures time corresponding to a distance between receiving terminals in the network (RTT: Round Trip Time). RTT corresponds to the round trip time between receiving terminals in the network. For example, in concrete terms, receiving terminal 102*a* enters a transmission time stamp in a measurement packet and transmits it to other receiving terminals 102*b* through 102*e*. Other receiving terminals 102*b* through 102*e* perform piggyback processing of the transmission time stamp of the received measurement packet, and each return it to receiving terminal 102*a*. By means of this processing, receiving terminals 102 can measure times corresponding to distances between a plurality of receiving terminals (RTTs). Measurement section 207 notifies retransmission request destination/retransmission request time decision section 204 of a time corresponding to a distance from the measured receiving terminal (RTT). This measurement and notification may be performed at the start of video distribution, or may be performed repeatedly during video distribution. Also, measurement section 207 may notify retransmission request destination/retransmission request time decision section 204 of an average of a plurality of measured times. Measurement section 207 may also notify retransmission request destination/retransmission request time decision section 204 of a weighted average of past measured times. Measurement section 207 also has a function of identifying the address of a router one level upstream to be passed through when transmitting a packet to each receiving terminal, and notifying retransmission request destination/retransmission request time decision section 204 of this.

Receiving section 206 receives a video packet, and has (1) a function of storing this video packet in reception buffer 203, (2) a function of detecting a loss from a gap in sequential numbers, and (3) a function of receiving retransmission packets and storing them in the reception buffer in sequential number order. Also, if a packet loss is detected, receiving section 206 notifies retransmission request destination/retransmission request time decision section 204 of an event indicating a packet loss as a retransmission request event. At this time, receiving section 206 notifies retransmission request destination/retransmission request time decision section 204 of the sequential number, playback time, and importance of the lost packet. Importance is determined by referencing a table set beforehand based on receive data.

Figure 5:
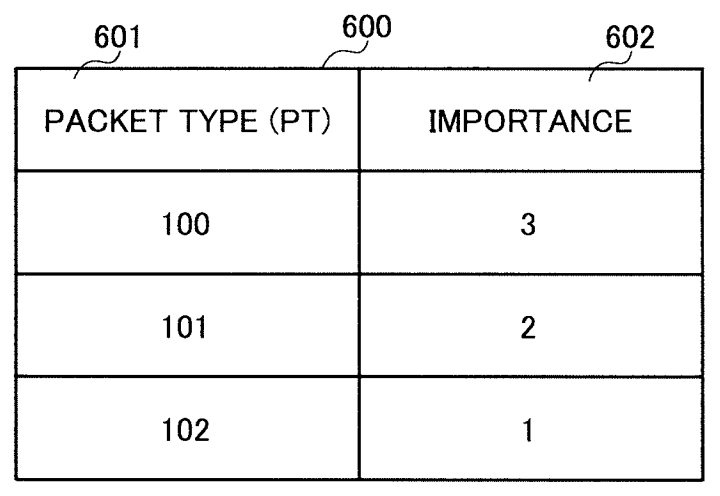

FIG. 5 shows an example of an importance determination table showing the importance of a packet to be retransmitted—that is, a lost packet—according to this embodiment. Specifically, reference code 601 indicates a packet type column, and reference code 602 indicates an importance column. Receiving section 206 obtains the importance of a packet by performing a search with the packet type, which is a specific item in a packet, as a key. Receiving section 206 notifies retransmission request destination/retransmission request time decision section 204 of this importance. Retransmission request destination/retransmission request time decision section 204 references the importance and determines a retransmission request transmission destination. A packet type is obtained by referencing an RTP (Real-time Transport Protocol) packet type. A packet type indicates a type of picture (I, P), or the like, for example. The method of obtaining the importance of a packet is not limited to referencing the packet type. Specifically, to determine whether or not a packet is an I-picture packet, not only the packet type but also a slice header in the payload of an RTP packet is referenced. That is to say, an importance determination table appropriate for an object to be assigned importance should be created beforehand.

Figure 6:
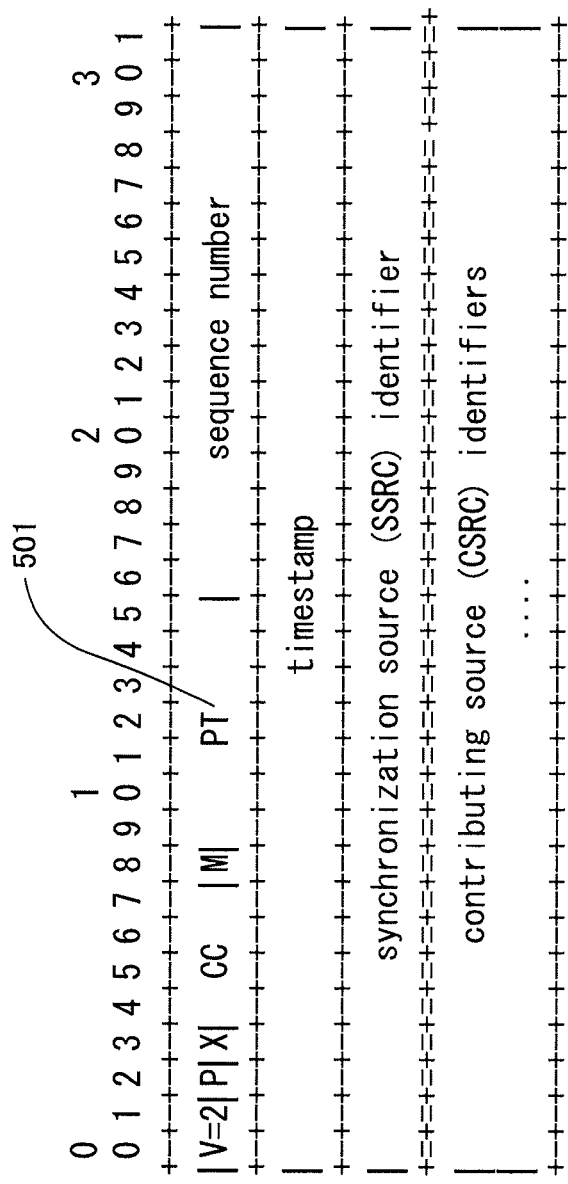
FIG. 6 is a drawing showing an example of an RTP header.

FIG. 6 shows an RTP header described in publication RFC3550 "RTP: A Transport Protocol for Real-Time Applications." Reference code 501 indicates an RTP packet type (PT). In video distribution, video data is transmitted with this RTP header included in a packet. At this time, receiving section 206 has a function (determining section) that determines importance by referencing RTP packet type 501 and importance determination table 600. Receiving section 206 may also be configured so as to use a UDP port number, SSRC, or the presence/absence of a marker bit when determining importance. In particular, retransmission request destination/retransmission request time decision section 204 determines importance corresponding to the packet type of a packet.

As a playback time, receiving section 206 may report the playback time precisely, or may report the result of subtracting a packet arrive jitter amount that can be predicted by receiving section 206 from the playback time.

Retransmission request destination/retransmission request time decision section 204 (calculation section, decision section) calculates for each terminal a float found by subtracting the current time and round trip time (RTT) from a playback time at which a lost packet is played back. Then, based on the calculated float, retransmission request destination/retransmission request time decision section 204 decides retransmission request transmission timing and a receiving terminal that is a retransmission request retransmission request destination (transmission destination). Then retransmission request transmitting section 205 transmits at least one retransmission request to at least one receiving terminal. Retransmission request destination/retransmission request time decision section 204 obtains the sequential number, playback time, and importance of a lost packet from a retransmission request event notified by receiving section 206.

Figure 7:
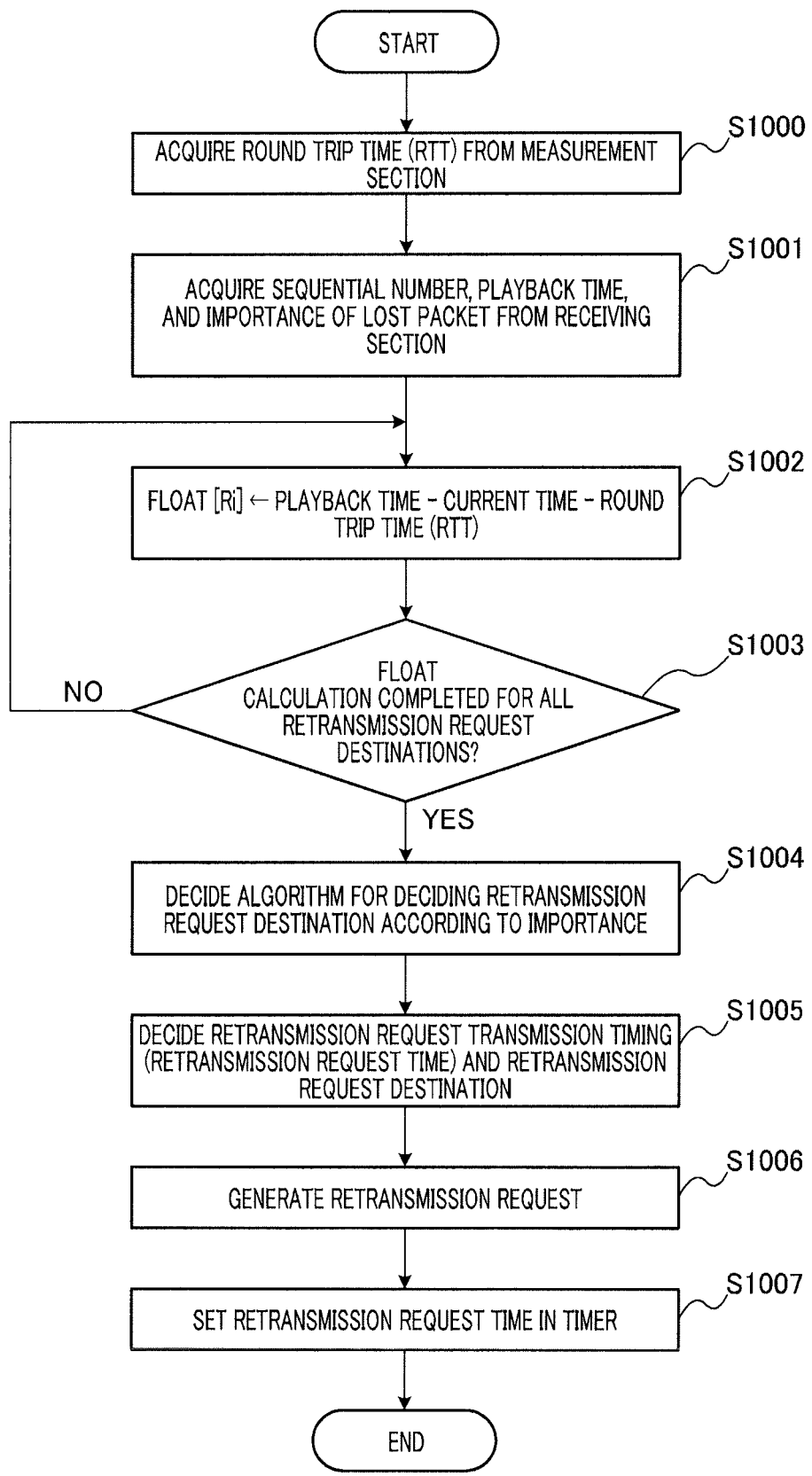
FIG. 7 is a flowchart showing a processing procedure for deciding a retransmission request destination and retransmission request time.

FIG. 7 shows the operational flow whereby retransmission request destination/retransmission request time decision section 204 decides a retransmission request destination and retransmission request time.

In step 1000, retransmission request destination/retransmission request time decision section 204 acquires round trip times (RTTs) between a receiving terminal and a plurality of receiving terminals from measurement section 207 at the start of video distribution or during video distribution.

In step 1001, retransmission request destination/retransmission request time decision section 204, on receiving a playback request event from receiving section 206, is notified of the playback time and importance of a lost packet (retransmitted packet) by receiving section 206. For example, if a lost packet is an I-picture packet its importance is high, and therefore receiving section 206 notifies retransmission request destination/retransmission request time decision section 204 of importance level 3 from among three levels.

In step 1002, retransmission request destination/retransmission request time decision section 204 finds a float by subtracting the current time and round trip time (RTT) from the playback time at which the lost packet is played back. In other words, the float is a time period calculated from the following equation and represents a time period until a retransmission request is transmitted from the current time:

Float=(time indicating playback time)−(current time)−(time corresponding to distance between terminals (RTT))

In step 1003, retransmission request destination/retransmission request time decision section 204 determines whether or not float calculation has been completed for all retransmission request destinations Ri (where i=1 to n, and n is an integer). If float calculation has not been completed for all retransmission request destinations (NO) the processing flow returns to step 1002, or if float calculation has been completed for all retransmission request destinations (YES) the processing flow proceeds to step 1004.

In step 1004, retransmission request destination/retransmission request time decision section 204 decides an algorithm for deciding a retransmission request destination according to importance. The algorithm decides a transmission timing (retransmission request time) and retransmission request destination in accordance with the float order (ascending or descending). If the importance of a lost packet is high, retransmission request destination/retransmission request time decision section 204 decides a transmission timing (retransmission request time) and retransmission request destination in accordance with ascending order of float. A specific algorithm may also be used instead of deciding an algorithm according to importance.

In step 1005, retransmission request destination/retransmission request time decision section 204 decides a retransmission request transmission timing (retransmission request time) and retransmission request destination based on the decided algorithm. Here, retransmission request destination/retransmission request time decision section 204 decides float directly as transmission timing. Retransmission request destination/retransmission request time decision section 204 may also calculate transmission timing by subtracting an appropriate numeric value from float. If importance is high, it is desirable for the retransmission request destination and transmission timing decision process to be carried out so as to enable a retransmission request to be transmitted to at least two or more retransmission request destinations.

In step 1006, retransmission request destination/retransmission request time decision section 204 generates a transmission request using a sequential number and retransmission request destination of the lost packet.

In step 1007, retransmission request destination/retransmission request time decision section 204 sets a retransmission request time in a retransmission timer for each retransmission request destination.

Retransmission request transmitting section 205 sequentially transmits retransmission requests to retransmission request destinations when a retransmission request time arrives.

The procedure (algorithm) for setting a retransmission request time in a timer will now be described in detail with reference to FIG. 8 and FIG. 9. Here, a case in which receiving terminal 1103 transmits a retransmission request will be described as an example.

Figure 8:
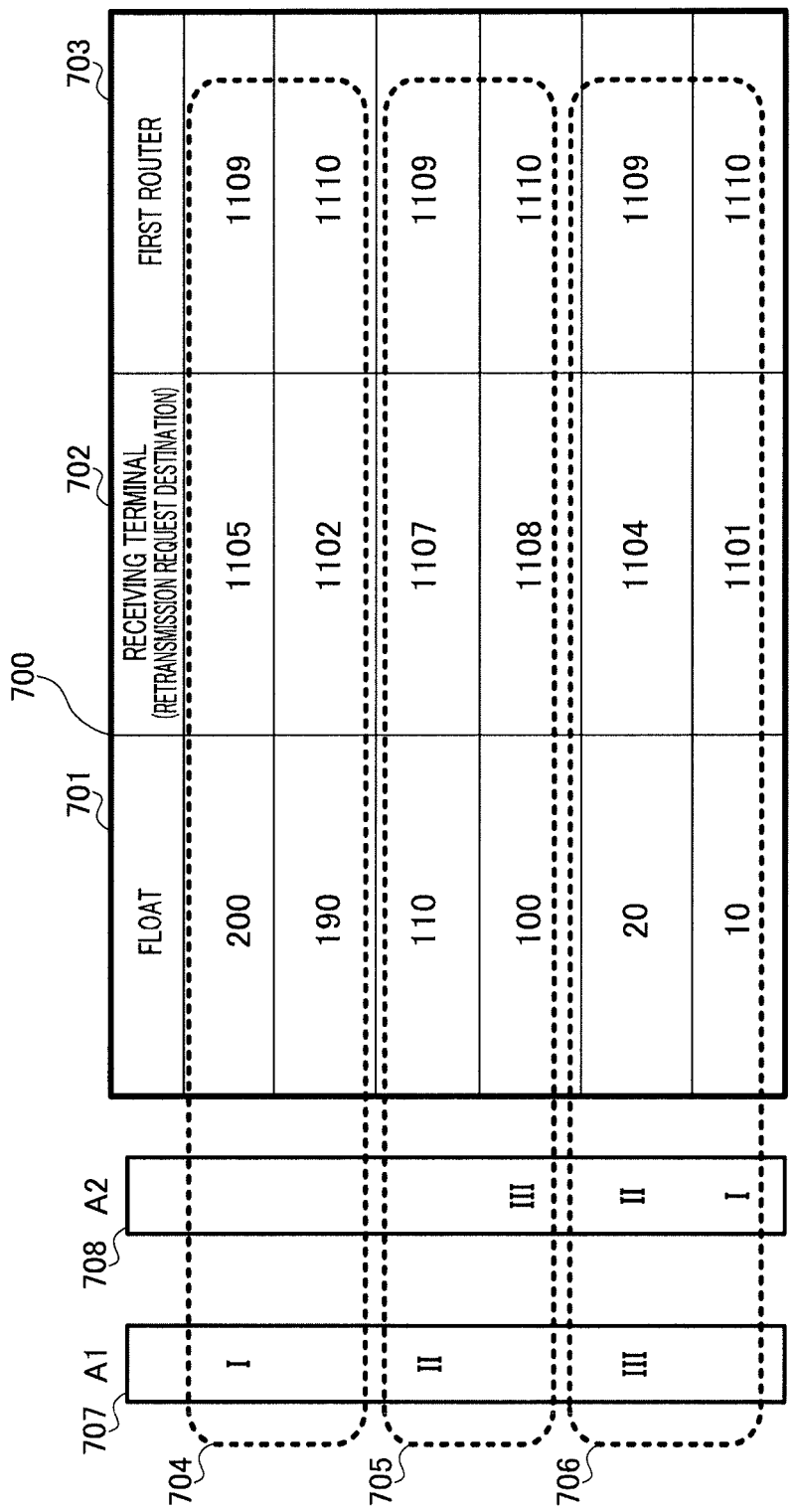
FIG. 8 is a drawing for explaining an algorithm for deciding a retransmission request destination and retransmission request time.

FIG. 8 is a drawing for explaining an algorithm for deciding a retransmission request destination and retransmission request time when receiving terminal 1103 transmits a retransmission request. Reference code 700 in FIG. 8 indicates a route table showing the relationship between a float and a first router for each receiving terminal that is a receiving terminal 1103 retransmission request destination. Reference code 701 indicates a float column, reference code 702 indicates a receiving terminal that is a retransmission request destination, and reference code 703 indicates a column showing a relationship to a first router to which receiving terminal 1103 is connected. Reference codes 707 and 708 respectively indicate examples A1 and A2 of an order decided by a retransmission request destination deciding algorithm.

Figure 9:
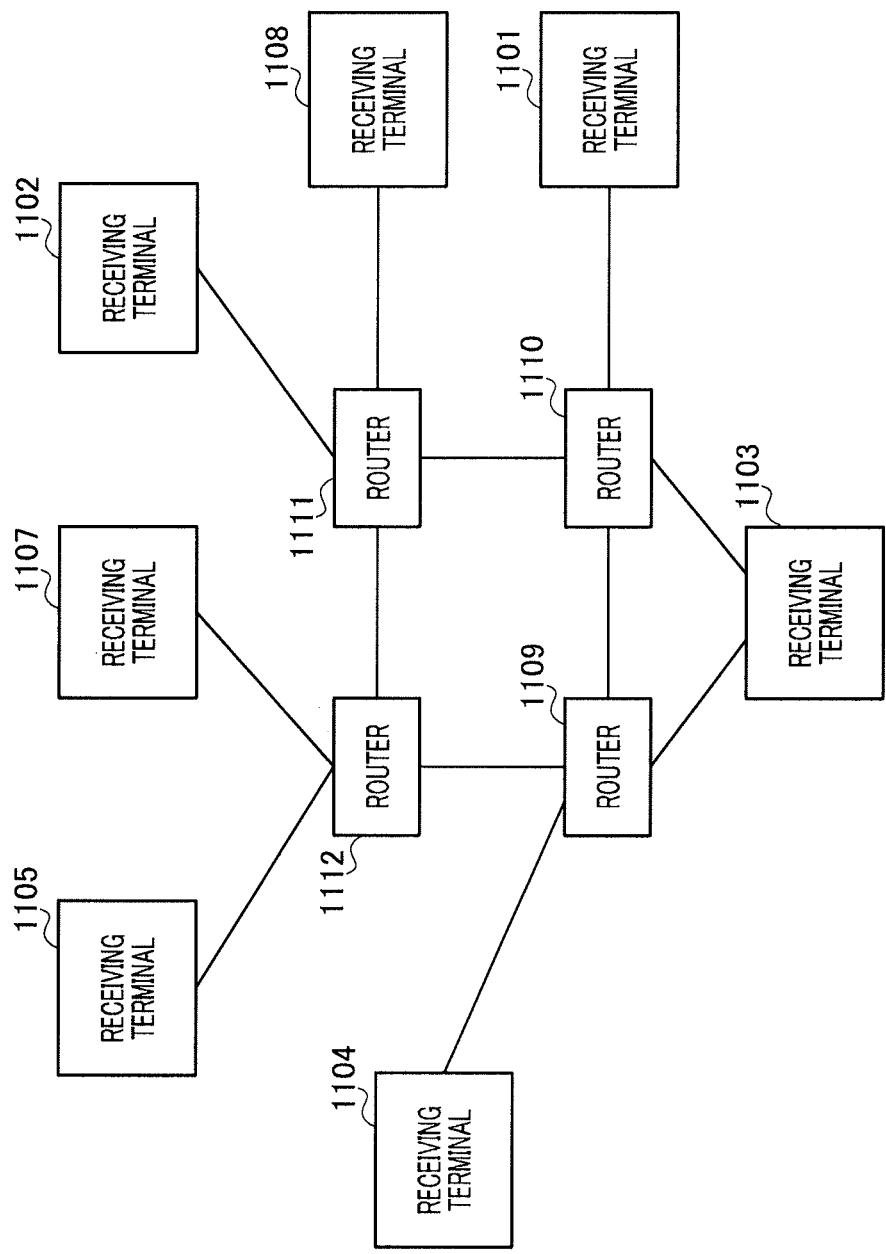
FIG. 9 is a drawing showing the connection relationship of receiving terminals corresponding to FIG. 8.

FIG. 9 is a drawing for explaining the state of receiving terminals corresponding to the route table shown in FIG. 8. Reference codes 1101 through 1108 in FIG. 9 indicate receiving terminals. Reference codes 1109 through 1112 in FIG. 9 indicate routers. The receiving terminals are connected via routers.

Reference codes 704 through 706 in FIG. 8 indicate groups composed of a plurality of receiving terminals that are grouped retransmission request destinations. For example, a group is formed of a predetermined number of receiving terminals in ascending order or descending order of float. Here, six receiving terminals are grouped in twos.

The address of a first router one level upstream of terminal 1103 is identified using traceroute, which is a means of measuring a router between specific terminals on the Internet. Alternatively, the address of a first router one level upstream can be acquired by referencing a next hop router entered in a route table for each counterpart held by each receiving terminal. For example, if the operating system of receiving terminal 1103 is Windows XP (registered trademark) or Linux (registered trademark), this route table is composed of network related information displayed on a display by means of a netstat-rn command. That is to say, a route table is a table containing information indicating a destination ultimately reached by a packet when transmitted to a particular counterpart (router) by a receiving terminal.

In above-described step 1002, retransmission request destination/retransmission request time decision section 204 completes calculation of float column 701 shown in route table 700 by calculating float. First, receiving section 206 decides number of retransmission request destinations n based on importance. Here, as an example, it will be assumed that number of retransmission request destinations n=3—that is, that it has been decided that a retransmission request will be transmitted to three retransmission request destinations. Next, retransmission request destination/retransmission request time decision section 204 decides a retransmission request destination.

First, by means of "algorithm 1", retransmission request destination/retransmission request time decision section 204 divides a plurality of receiving terminals that are retransmission request destinations into n groups. As a dividing algorithm, retransmission request destinations are sorted in ascending order of float, and divided in ascending order or descending order on this basis. That is to say, retransmission request destination/retransmission request time decision section 204 divides a plurality of receiving terminals into a plurality of groups in float order.

Reference codes 704 through 706 in FIG. 8 are groups of retransmission request destinations grouped in accordance with this algorithm. Next, retransmission request destination/retransmission request time decision section 204 decides on a terminal having a large float in each group as retransmission request destination receiving terminals (I through III). Retransmission request destination/retransmission request time decision section 204 decides retransmission request transmission timing and retransmission request destination receiving terminals to which retransmission is requested in accordance with the float order. In the example shown in FIG. 8, it is shown that receiving terminals 1105, 1107, and 1104 are decided on as retransmission request destination receiving terminals.

Reference code 707 in FIG. 8 indicates retransmission request destination decision example A1. A1 indicates a retransmission request destination decided in accordance with "algorithm 1". In this way, retransmission request destination/retransmission request time decision section 204 sets a timer for each decided retransmission request destination receiving terminal so as to transmit a retransmission request within a float or after a float. At this time, a float may be applied directly as a set timing, or scheduling may be performed using a timing obtained by subtracting a random time period from a float in order to prevent retransmission packets from arriving in a concentrated fashion at a receiving terminal that transmits a retransmission request. Around 10% of a float may be used as the maximum value of a random time period, for example, or, if band W of the network upstream of a receiving terminal that transmits a retransmission request is known beforehand, the maximum value may be calculated by means of expression "n*s/W/" using this W (bytes/sec), number of retransmission request destinations n, and retransmission packet size S (bytes). Also, a terminal with a small float may be selected from each group as a retransmission request destination.

Next, an algorithm for deciding a retransmission request destination and retransmission request time by means of "algorithm 2" will be described. With "algorithm 2", n receiving terminals (I through III of A2) are decided as retransmission request destinations from terminals having a small float. That is to say, retransmission request destination/retransmission request time decision section 204 decides on receiving terminals 1101, 1104, and 1108 that are retransmission request destinations to which retransmission is requested in ascending order of float. "Algorithm 2" is an algorithm selected when the importance of a lost packet is high. When importance is equal to or higher than a stipulated value (for example, "3" in FIG. 5, retransmission request destination/retransmission request time decision section 204 decides on receiving terminals that are retransmission request transmission destinations in ascending order of float. The method of setting a timer for each decided retransmission request destination receiving terminal so as to transmit a retransmission request within a float or after a float is the same as for retransmission request destination receiving terminals decided by means of "algorithm 1". An advantage of "algorithm 2" is that retransmission requests can be scheduled again even if all retransmission requests are lost. For example, the last retransmission request of retransmission request destination decision example A2 is transmitted to receiving terminal 1108 after float "100". The time unit of "100" is not limited, but may be a millisecond—that is, transmission may be performed after 100 milliseconds. If a retransmission packet has not been transmitted after the elapse of a time period corresponding to the distance from receiving terminal 1108, it is possible that all n retransmission requests have been lost. In this case, retransmission request destination/retransmission request time decision section 204 recalculates float 701 using the current time (steps 1002 and 1003). Retransmission request destination/retransmission request time decision section 204 executes retransmission request destination deciding and retransmission request transmission again.

Next, an algorithm for deciding a retransmission request destination and retransmission request time by means of "algorithm 3" will be described. With "algorithm 3", n terminals are decide on as retransmission request destinations from terminals for which the first routers differ and float is small. The first routers of receiving terminal 1103 are router 1109 and router 1110. With "algorithm 3", when retransmission request destination/retransmission request time decision section 204 decides a retransmission request destination, it first classifies receiving terminals on a first router basis using first router column 703. Taking the example shown in FIG. 8, receiving terminal 1104 having the smallest float is decided on as a first retransmission request destination from a group (receiving terminals 1104, 1107, and 1105) having router 1109 as a first router. Next, retransmission request destination/retransmission request time decision section 204 decides on receiving terminal 1107 having the second-smallest float as a second retransmission request destination from a group (receiving terminals 1101, 1108, and 1102) having router 1110 as a first router. Then retransmission request destination/retransmission request time decision section 204 decides on receiving terminal 1105 having the third-smallest float as a third retransmission request destination from a group (receiving terminals 1104, 1107, and 1105) having router 1109 as a first router. The method of setting a timer for each decided retransmission request destination receiving terminal so as to transmit a retransmission request within a float or after a float is the same as for retransmission request destination receiving terminals decided by means of "algorithm 1".

Thus, according to this embodiment, a retransmission request destination is decided, and a retransmission request is set in a timer and scheduled, enabling heightening of a load due to retransmission requests in a network to be prevented, as a result of which it is possible to reduce the possibility of a retransmission request being lost. This enables high-quality video distribution to be performed.

In this embodiment, a method using a unicast has been described as a retransmission request transmitting method, but a plurality of retransmission request destinations may also be entered in a destination list of an XCAST packet and scheduled by means of a timer. At this time, retransmission request destination/retransmission request time decision section 204 may set a retransmission request time in line with the smallest float, or may set a time that allows for a time for XCAST packet transmission between receiving terminals in cascade. Specifically, a time obtained by multiplying the maximum round trip time between receiving terminals from among retransmission request destination candidates by m may be used as a time for XCAST packet transmission between receiving terminals in cascade. Alternatively, round trip times between receiving terminals may be measured beforehand, after which this information is shared among the receiving terminals, and the sum of round trip times in which transfer is performed between receiving terminals in cascade is used.

Retransmission requests may also be similarly transmitted by means of an application level multicast.

Using an XCAST packet or application level multicast enables the load on a network near a receiving terminal to be decreased, as a result of which the possibility of a retransmission request being lost is reduced. This enables high-quality video distribution to be performed.

(Embodiment 2)

A receiving terminal according to this embodiment differs from Embodiment I in adaptively estimating an available band between the receiving terminal and another receiving terminal, and making a retransmission request at a point in time at which a margin arises in the available band.

Figure 10:
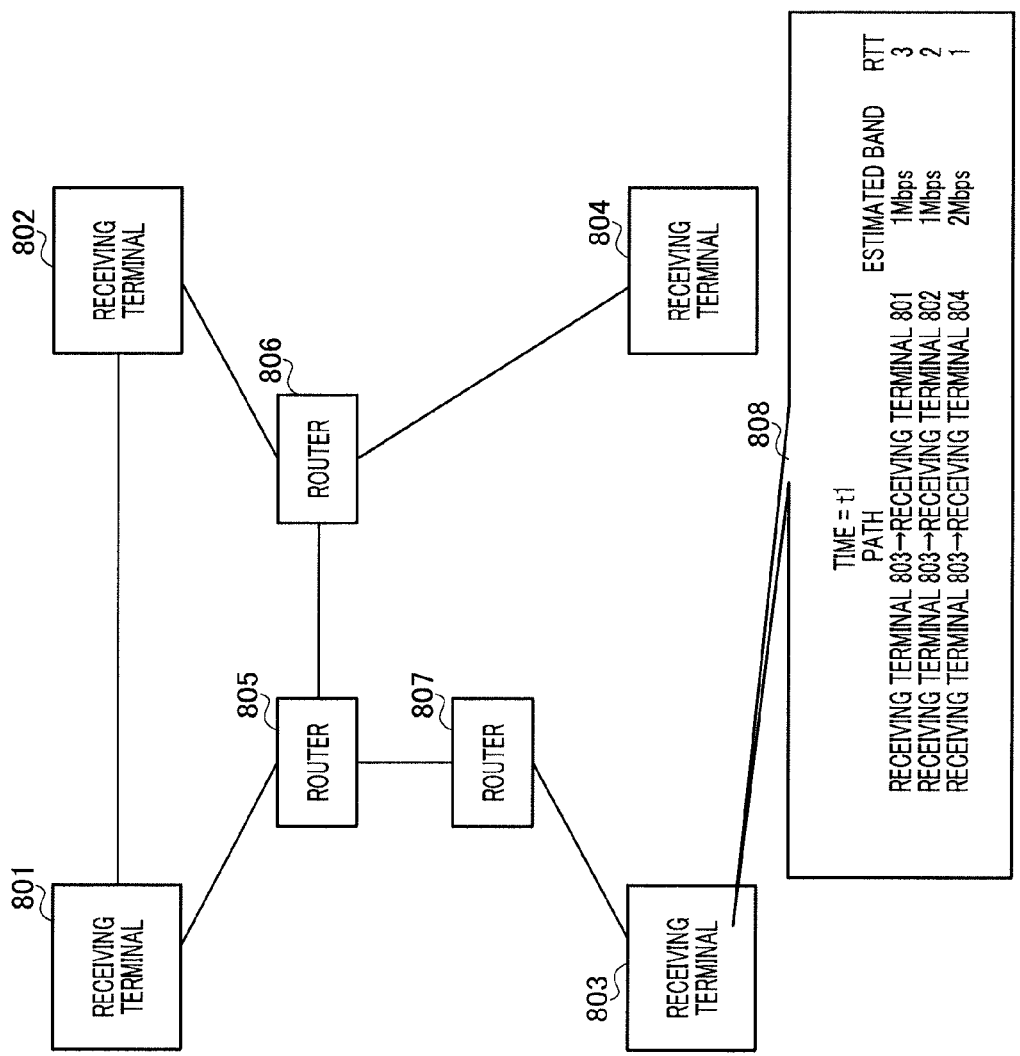
FIG. 10 is a schematic diagram showing a sample configuration whereby receiving terminals according to Embodiment 2 of the present invention are disposed in a network.

FIG. 10 is a schematic diagram showing a sample configuration whereby receiving terminals according to Embodiment 2 of the present invention are disposed in a network. FIG. 10 shows how receiving terminals according to this embodiment are disposed and operated in a network. In FIG. 10, reference codes 801 through 804 indicate receiving terminals, and reference codes 805 through 807 indicate routers composing a network. Reference code 808 indicates bands and round trip times (RTTs) observed and estimated by receiving terminal 803 at time t1.

Receiving terminals 801 through 804 perform teleconferencing while transmitting video and speech streaming bidirectionally. Communication is performed directly between receiving terminal 801 and receiving terminal 802 without the intermediation of a router. Specifically, there are methods of communicating using a radio connection such as a wireless LAN or Bluetooth (registered trademark) . Separately from this, receiving terminal 801 and receiving terminal 802 are connected respectively to router 805 and router 806. Also, receiving terminal 803 and receiving terminal 804 are connected respectively to router 807 and router 806.

When transmitting video and speech data to their respective counterpart receiving terminals using a unicast, receiving terminals 801 through 804 estimate an available band using TFRC.

If a video streaming packet from receiving terminal 801 to receiving terminal 803 is lost, receiving terminal 803 decides on a retransmission request destination using the method described in Embodiment 1, and transmits a retransmission request. Here, retransmission request destination/retransmission request time decision section 204 of receiving terminal 803 takes not only float but also band vacancy conditions into consideration in setting the timing for transmitting a retransmission request.

Figure 11:
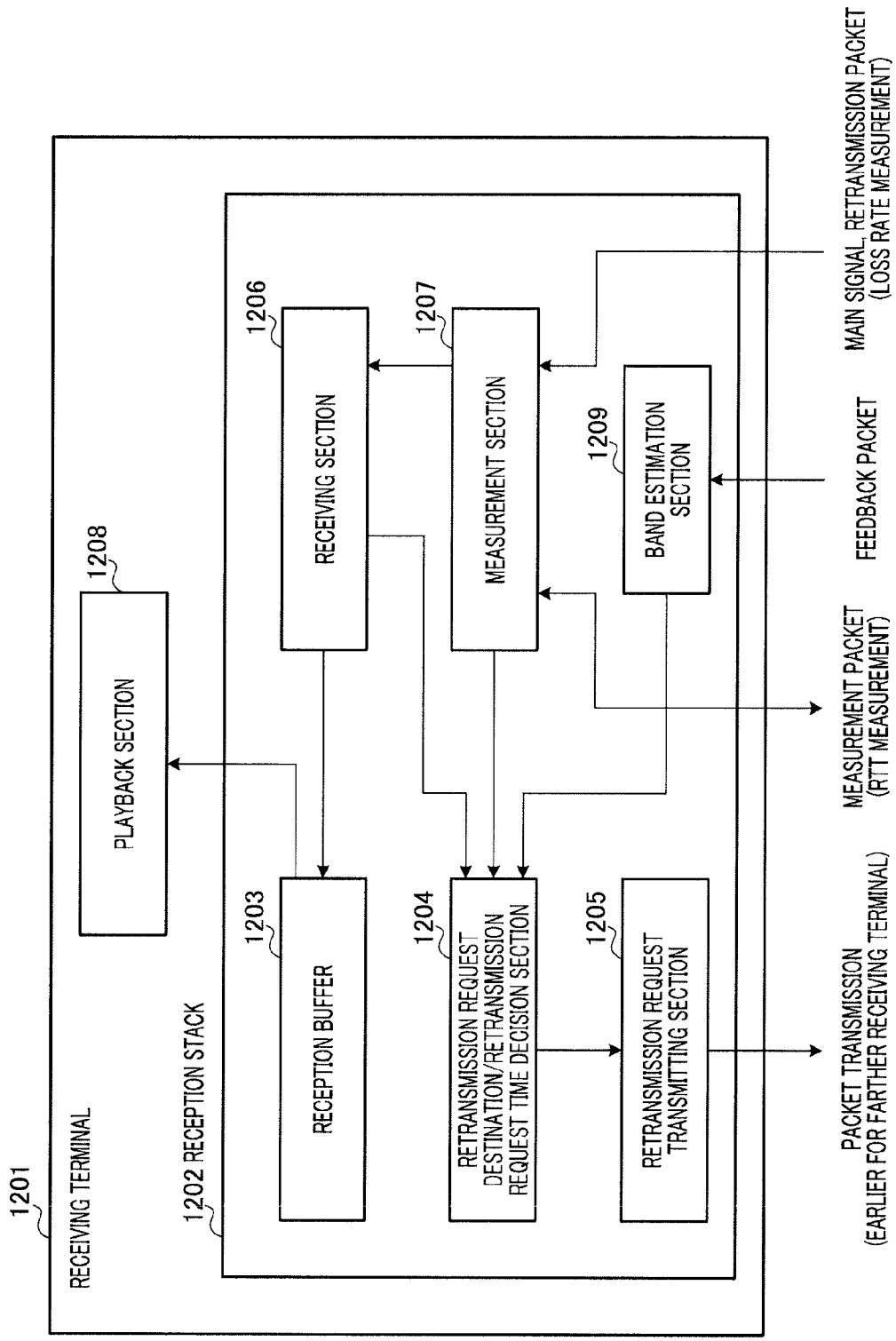
FIG. 11 is a block diagram showing the configuration of a receiving terminal according to this embodiment.

FIG. 11 is a drawing showing a sample configuration of a receiving terminal having a band estimation section that estimates an available band using TFRC. Receiving terminal 1201 in FIG. 11 is configured by adding band estimation section 1209 to receiving terminal 102 in FIG. 4. Configuration elements indicated by reference codes 1202 through 1208 in FIG. 11 are the same as the configuration elements indicated by reference codes 202 through 208 respectively in FIG. 4.

Band estimation section 1209 has a function of receiving feedback relating to the transmission conditions of a stream transmitted to another receiving terminal by receiving terminal 1201, and estimating an available band. Specifically, band estimation section 1209 has a function of estimating a band from a loss event rate and round trip time (RTT) between receiving terminals using a TFRC algorithm described in Non-patent Document 2. Band estimation section 1209 estimates a band momentarily and notifies retransmission request destination/retransmission request time decision section 1204 of the estimated band.

FIG. 12 is a drawing showing a retransmission request time at which receiving terminal 803 transmits a retransmission request, a band estimated using this TFRC, and a band used for video distribution. Reference code 901 in FIG. 12 indicates temporal transition of a band estimated by receiving terminal 803 using TFRC. Reference code 902 indicates a band used by receiving terminal 803 for video distribution. Time t1 is a time at which receiving terminal 803 detects a packet loss. Time t2 is the playback time for video of the lost packet, and time t3 through time t5 indicate times resulting from subtracting round trip times vis-à-vis receiving terminal 804, receiving terminal 802, and receiving terminal 801 respectively from the playback time. Time t6 and time t7 are transmission candidate times. Time t6 is a vacant band occurrence time. Floats of receiving terminal 804, receiving terminal 802, and receiving terminal 801 are, respectively, time t3-time t1, time t4-time t1, and time t5-time t1. When retransmission request transmission timing is decided by means of "algorithm 1" described in Embodiment 1, the time of transmission to receiving terminal 801 is time t5. However, with "algorithm 4" described in this embodiment, a retransmission request to receiving terminal 801 is transmitted at time t7.

That is to say, with "algorithm 4", retransmission request destination/retransmission request time decision section 1204 transmits a retransmission request at time t7, which is a point in time at which a vacancy occurs in the band sufficient to transmit a retransmission request in the period until retransmission request transmission timing is reached according to "algorithm 1". Specifically, a retransmission request is transmitted at timing that satisfies the two conditions below in an order in which it is necessary to transmit a retransmission request at the earliest time.

Condition 1: Band estimation section 1209 records in retransmission request destination/retransmission request time decision section 1204 time T (t6 in FIG. 12) at which estimated band 901 exceeds used band 902 used for transmission by predetermined amount $\alpha$.

Condition 2: Retransmission request destination/retransmission request time decision section 1204 determines that estimated band 901 always exceeds used band 902 used for transmission during the elapse of time $(S/\alpha)$ (where S is the retransmission request packet size) from time T (t6 in FIG. 12).

Timing $(T+(S/\alpha))$ at which the above two conditions are first satisfied is taken as a retransmission request time (t7 in FIG. 12) at which retransmission request transmission is performed. When a retransmission request is once transmitted, retransmission request destination/retransmission request time decision section 1204 newly records that time as time T again, and sets the next retransmission request transmission timing to timing at which the above two conditions are satisfied. That is to say, a time at which a band estimated by band estimation section 1209 exceeds a band used for transmission by a receiving terminal for a predetermined time is decided on as retransmission request transmission timing.

A band necessary for transmitting one retransmission request in one round trip time period may be applied as the value of $\alpha$. That is to say, retransmission request destination/retransmission request time decision section 1204 takes account of a band consumed by a packet floating between a counterpart that transmits a retransmission request and the terminal itself and a band consumed by transmitting a retransmission request, and transmits a retransmission request when a margin arises in an available band equivalent to a band that enables one retransmission request to be transmitted in one round trip time period. For example, if one round trip time period is 30 ms and the retransmission request packet size is 100 bytes, the value of $\alpha$ is found to be 2666 bits/sec.

However, the value of $\alpha$ is not limited to 2666 bits/sec. That is to say, a value greater than or equal to 2666 bits/sec may be used. Also, under load conditions whereby the network load is constant, a value smaller than 2666 bits/sec may be used. That is to say, it is possible for the value of $\alpha$ to be set arbitrarily.

Thus, according to this embodiment, a time at which a band estimated by band estimation section 1209 exceeds a band used for transmission by a receiving terminal for a predetermined time is decided on as retransmission request transmission timing, making it possible to transmit a retransmission request at a time at which a vacant band sufficient for transmitting a retransmission request can be secured. Also, a plurality of receiving terminals are no longer transmitted simultaneously. As a result, the probability of successful retransmission increases, making high-quality video transmission possible.

The disclosure of Japanese Patent Application No. 2007-175562, filed on Jul. 3, 2007, including the specification, drawings and abstract, is incorporated herein by reference in its entirety.

Industrial Applicability

A receiving terminal according to the present invention is suitable for an application in which it is necessary to compensate for a packet loss while maintaining real-time characteristics, such as live video distribution to a plurality of receiving terminals or a multipoint teleconferencing system.

The invention claimed is:

1. A receiving terminal apparatus that transmits a retransmission request for compensating for a lost packet lost in a network, the receiving terminal apparatus comprising:
    a measurement section that measures a time period corresponding to a distance in the network between the receiving terminal apparatus and a plurality of other receiving terminal apparatuses;
    a calculation section that calculates, for each of the receiving terminal apparatuses, a float, by subtracting a current time and a time period measured by the measurement section from a playback time at which a retransmitted packet is played back, the float being a spare time period; and
    a decision section that decides, as retransmission request transmission destinations, a predetermined number of other receiving terminal apparatuses from the plurality of other receiving terminal apparatuses based on the calculated float and further decides a retransmission request transmission timing for each of the decided retransmission request transmission destinations based on the calculated float, wherein
    the calculation section calculates a plurality of the floats, each of which corresponds to one of the receiving terminal apparatuses, and
    the decision section decides the retransmission request transmission timing and the retransmission request transmission destinations in accordance with an order of the plurality of the calculated floats, and at least one of the measure section, the calculation section, and the decision section comprise a processor.

2. The receiving terminal apparatus according to claim 1, wherein the decision section divides the plurality of other receiving terminal apparatuses into a plurality of groups in accordance with the order of the plurality of calculated floats and decides the retransmission request transmission destinations on a group-by-group basis.

3. The receiving terminal apparatus according to claim 1, further comprising:
    an estimation section that estimates an available band vis-à-vis the plurality of receiving terminal apparatuses,
    wherein the decision section decides a time at which the available band estimated by the estimation section exceeds a band used for transmission by the receiving terminal apparatus for a predetermined time as the retransmission request transmission timing.

4. The receiving terminal apparatus according to claim 1, further comprising:
    a determination section that determines importance according to a packet type of the lost packet,
    wherein the decision section decides the retransmission request transmission destinations in ascending order of the plurality of calculated floats when the importance of the lost packet is equal to or higher than a stipulated value.

5. The receiving terminal apparatus according to claim 1, wherein the retransmission request is an XCAST packet.

6. A receiving method in a receiving terminal that transmits a retransmission request for compensating for a lost packet lost in a network, the receiving method comprising:
    measuring a time period corresponding to a distance in the network between the receiving terminal and a plurality of other receiving terminals;
    calculating for each of the receiving terminals a float, by subtracting a current time and a time period measured by the measuring from a playback time at which a retransmitted packet is played back; and
    deciding, as retransmission request transmission destinations, a predetermined number of other receiving terminal apparatuses from the plurality of other receiving terminals based on the calculated float, and
        deciding a retransmission request transmission timing for each of the decided retransmission request transmission destinations based upon the calculated float, wherein
    the calculating the float calculates a plurality of the floats, each of which corresponds to one of the receiving terminal apparatuses, and
    the deciding a retransmission request timing decides the retransmission request transmission timing and the retransmission request transmission destinations in accordance with an order of the plurality of the calculated floats, and at least one of the measuring, the calculating, the deciding a predetermined number and the deciding a retransmission request timing is performed by a processor.

* * * * *